United States Patent [19]
Furukawa

[11] Patent Number: 5,104,215
[45] Date of Patent: Apr. 14, 1992

[54] MICROFILM CARTRIDGE STORAGE AND RETRIEVAL SYSTEM

[75] Inventor: Takao Furukawa, Tokyo, Japan

[73] Assignee: Fuji Photo Film Co., Ltd., Kanagawa, Japan

[21] Appl. No.: 709,843

[22] Filed: Jun. 4, 1991

[30] Foreign Application Priority Data

Jun. 5, 1990 [JP] Japan .................. 2-146581
Jun. 5, 1990 [JP] Japan .................. 2-146582

[51] Int. Cl.⁵ .................. G03B 21/00; G03B 23/12
[52] U.S. Cl. .................. 353/26 A; 353/26 R; 353/25; 353/121
[58] Field of Search .......... 353/26 A, 26 R, 25, 353/121, DIG. 2, 27 A, 122, 119; 352/123, 73, 72

[56] References Cited

U.S. PATENT DOCUMENTS

| | | | |
|---|---|---|---|
| 3,164,059 | 1/1965 | Turrentine, Jr. | 353/26 A |
| 3,732,546 | 5/1973 | Ronkin et al. | 353/26 A |
| 4,113,366 | 9/1978 | Glover | 352/123 |
| 4,353,642 | 10/1982 | Weigert | 353/25 |
| 4,936,677 | 6/1990 | Koumura et al. | 353/26 A |
| 4,938,586 | 7/1990 | Hirose et al. | 353/26 A |
| 4,949,106 | 8/1990 | Igarashi | 353/26 A |

FOREIGN PATENT DOCUMENTS

| | | | |
|---|---|---|---|
| 0137141 | 6/1986 | Japan | 353/26 A |
| 0137142 | 6/1986 | Japan | 353/26 A |
| 0229446 | 9/1988 | Japan | 353/26 R |

Primary Examiner—William A. Cuchlinski, Jr.
Assistant Examiner—William C. Dowling
Attorney, Agent, or Firm—Sughrue, Mion, Zinn, Macpeak & Seas

[57] ABSTRACT

A microfilm storage and retrieval system for storing plural microfilm cartridges in a storage rack and for selectively retrieving a desired cartridge. Plural microfilm cartridges are stored two-dimensionally in a rack having an open front face at which a carrier for taking out and returning the cartridges is disposed. An image reader is arranged behind the rack. A cartridge delivery port is provided through the rack, so that each cartridge is taken out from the rack into the space in front of the rack and then delivered through the delivery port to the image reader arranged behind the rack to read the images of the microfilm. In a preferred embodiment, the selected microfilm cartridge is turned to change its posture or orientation ready to be loaded into a cartridge loading port of the image reader in a space behind the rack intermediately of the delivery passage.

12 Claims, 11 Drawing Sheets

MICROFILM CARTRIDGE STORAGE AND RETRIEVAL SYSTEM

BACKGROUND OF THE INVENTION

1. Field of the Invention

The present invention relates to a method of and system for storing plural microfilm cartridges in a storage rack and for selectively retrieving a desired microfilm cartridge from the storage rack to deliver the selected microfilm cartridge to an image reader or another type image processing device.

2. Prior Art Statement

It is known in the art to store plural microfilm cartridges in a storage rack having one open face extending two-dimensionally, the storage rack being combined with a carrier which is movable in two-dimensional directions while facing to said one open face of the storage rack. A desired microfilm cartridge is taken out of the storage rack and then delivered to an image reader by the aforementioned carrier. In the known system of this type, the image reader is arranged in the space in front of said one open face of the storage rack, i.e. at the same side in which the carrier is disposed.

However, this known system has a disadvantage that the image reader impedes the inspection and maintenance operations of the carrier to make it hard to inspect and adjust the carrier. Furthermore, when it is desired to store microfilm cartridges in the rack or the stored microfilm cartridges are to be exchanged with other microfilm cartridges, the image reader must be moved aside from the position in front of the storage rack. The operation efficiency in storing or exchanging the microfilm cartridges is thus lowered.

In general, easy access to the image reader not only from the front side on which the display screen is positioned but only from the backside becomes necessary for various inspection and maintenance operations. However, since the storage rack is positioned close to the backside of the image reader in the known system, access to the backside of the image reader becomes difficult to cause problems.

In order to obviate the aforementioned disadvantage, the image reader would be arranged at a position remote from the storage rack. However, such an arrangement poses another problem that the passage for delivering the selected microfilm cartridge becomes prolonged and complicated to lower the reliability in microfilm cartridge delivery operation.

The selected microfilm cartridge taken out of the storage rack is turned to a posture or orientation suited for loading thereof into the image reader. For this purpose, an additional spacing must be left outside of the storage rack to lead to a result that the dimensions of the entire system become larger.

Another disadvantage of the known system is that the size of the carrier tends to be larger and the weight thereof tends to be increased, leading to reduction in moving speed and increase in inertia to require the provision of a large scale driving mechanism, since the microfilm cartridge is turned by the carrier.

OBJECTS AND SUMMARY OF THE INVENTION

Accordingly, an object of this invention is to provide a microfilm cartridge storage and retrieval system in which a storage rack and an image reader are arranged in a reasonable positional relationship with each other to make easy access to the image reader not only from the front side but also from the backside, a carrier for delivering a selected microfilm cartridge being arranged so that access thereto is not obstructed by the image reader and the passage for delivering the selected microfilm cartridge is simplified and shortened to ensure reliability of the delivery operation.

Another object of this invention is to provide such a system for ensuring easy storage and/or exchange of microfilm cartridges.

A further object of this invention is to provide such a system in which the normally vacant space needed for turning the selected microfilm cartridge during the cartridge delivery operation is lessened to be reduced in size of the entire system.

A still further object of this invention is to provide such a system in which a light and small size carrier is assembled to reduce the inertia thereof so that it can be moved by a light and small size driving mechanism at a relatively high moving speed.

The objects of this invention are achieved by the provision of a microfilm cartridge storage and retrieval system for storing microfilm cartridges and for selectively retrieving a desired microfilm cartridge from the stored cartridges, comprising:

a storage rack having an open front face and having plural cartridge storage compartments each storing therein one microfilm cartridge, said plural cartridge storage compartments being arranged two-dimensionally such that their open front faces extend along a substantially vertical plane;

a carrier for delivering said microfilm cartridges into and out of said storage rack and positioned in front of said open front face of said storage rack to be moved two-dimensionally along the vertical and horizontal planes; and an image reader for reading the images contained in the selectively retrieved microfilm cartridge and positioned behind said storage rack;

said storage rack having a delivery port through which said selectively retrieved microfilm cartridge is delivered from said compartment beyond the backside face of said storage rack;

said image reader having a microfilm cartridge loading port provided at a position close to said delivery port of said storage rack;

whereby said selectively retrieved microfilm cartridge is pulled out of said storage rack by said carrier to be moved in the space in front of said storage rack and then delivered through said delivery port to said cartridge loading port.

A desired microfilm cartridge is selected and taken out of the storage rack, in which plural microfilm cartridges are stored in respective compartments arranged two-dimensionally, and delivered through the delivery port by the carrier movable in a space facing to one open face, i.e. the front open face, of the storage rack. The delivery port may be a window formed through a portion at the substantial center of the storage rack or a cut-out or broken corner portion of the storage rack. The microfilm cartridge moving through the delivery port is delivered to the image reader arranged in a space behind the rack, i.e. the backside opposite to the front open face of the rack. The image reader has a cartridge loading port provided on either one of the side walls of the image reader, the side wall provided with the cartridge loading port being positioned close to the delivery port so that the selected microfilm cartridge is delivered through a passage which is shorter and more simplified than that in the conventional system. Particularly when the delivery port is a window positioned at the substantial center of the storage rack, the length of the delivery passage becomes minimal to increase in efficiency for delivery operation. In addition, when the delivery port is a window positioned at the substantial center of the storage rack, the cartridge loading port of the image reader can be positioned close to the substantial center of the backside face of the storage rack. As a result, the storage rack and the image reader are combined in the mutual relationship such that a generally T-shaped arrangement is formed thereby when viewed in the plan view. Accordingly, a vacant space ensuring easy access to the backside of the image reader is left.

After the operation for reading or searching the images by the image reader is completed, the microfilm cartridge is unloaded from the image reader and delivered through the delivery passage in the reverse direction to be returned back into the initial compartment of the storage rack.

Meanwhile, the carrier for taking up and returning back the selected microfilm cartridge may have a construction for moving through the delivery port to pass the cartridge directly to the cartridge loading port of the image reader, or a separate cartridge delivery means may be provided to pass the cartridge from the carrier to the cartridge loading port of the image reader. The separate cartridge delivery means may be provided with means for turning the cartridge to change the posture or orientation of the cartridge well suited for loading.

BRIEF DESCRIPTION OF THE DRAWINGS

Preferred embodiments of the invention will now be described with reference to the appended drawings, in which.

EMBODIMENTS OF THE INVENTION

Preferred embodiments of the invention will now be described in detail with reference to the drawings.

Figure 1:
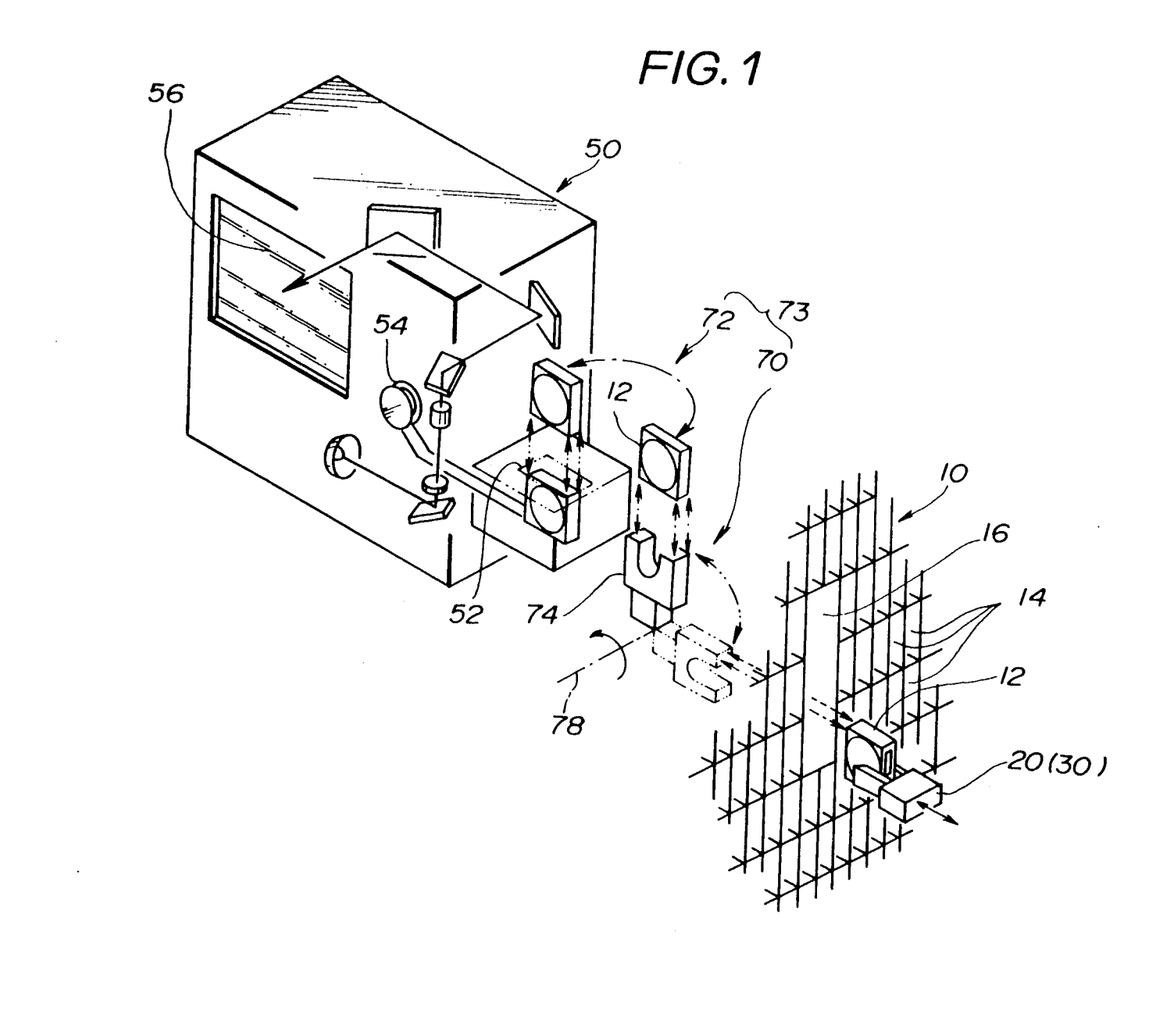
FIG. 1 is a diagrammatical illustration showing the cartridge delivery passage in one embodiment of the invention.
Figure 2:
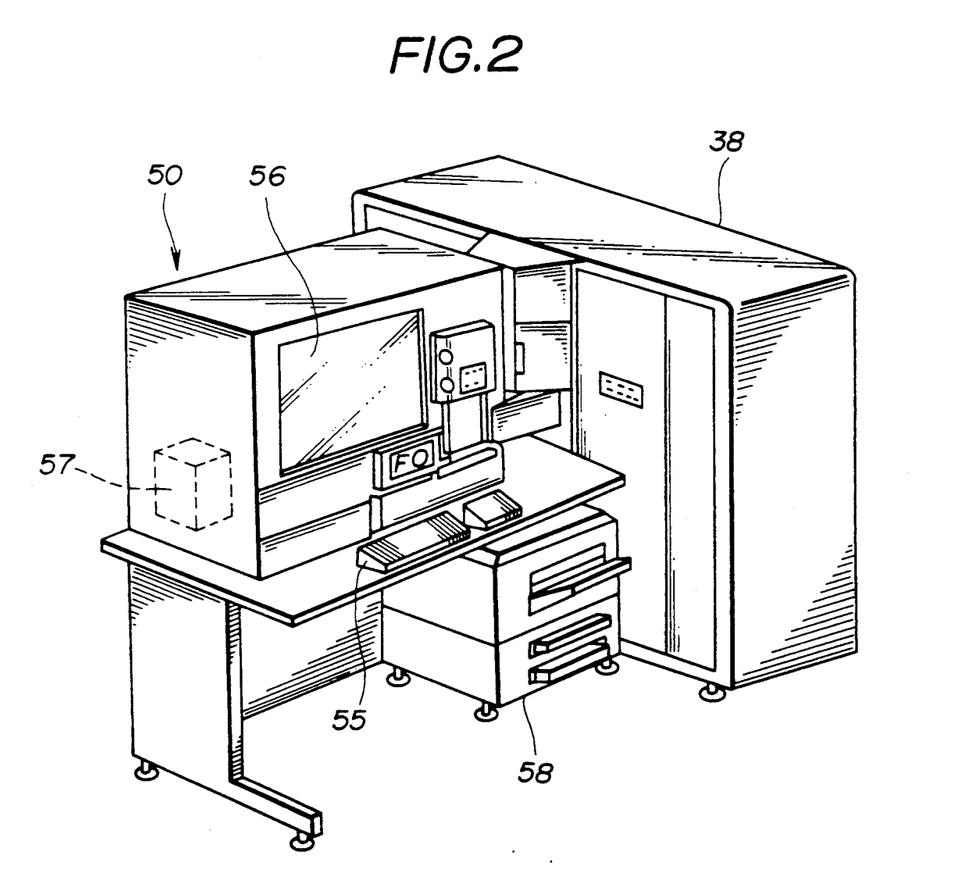
FIG. 2 is a perspective view showing the general arrangement of the entire system.
Figure 3:
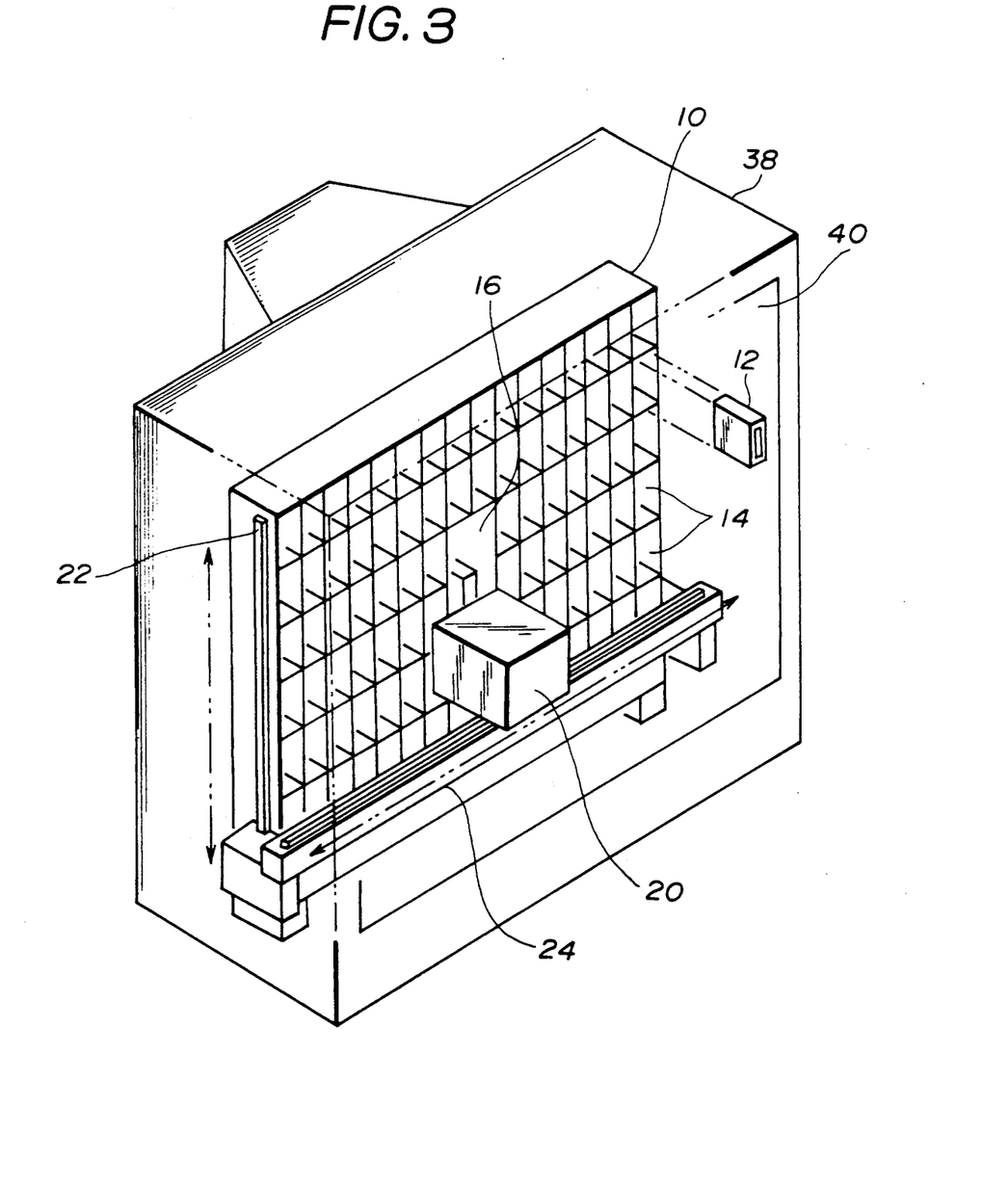
FIG. 3 is a perspective view showing the storage rack and the carrier.

Initially referring to FIGS. 1 to 3, reference numeral 10 designates a storage rack in which plural microfilm cartridges 12 are stored. In detail, storage rack 10 has plural cartridge storage compartments 14 for containing one microfilm cartridge 12 for each compartment 14. These compartments 14 are arranged to form a two-dimensional array, and each microfilm cartridge 12 is contained in the upstanding posture with its one side wall contacting with the bottom 14a of the compartment 14.

Referring now to FIGS. 10, 11A, 11B, 12A and 12B, the detailed construction of each microfilm cartridge and the guide provided in each storage compartment 14 will be described.

Figure 10:
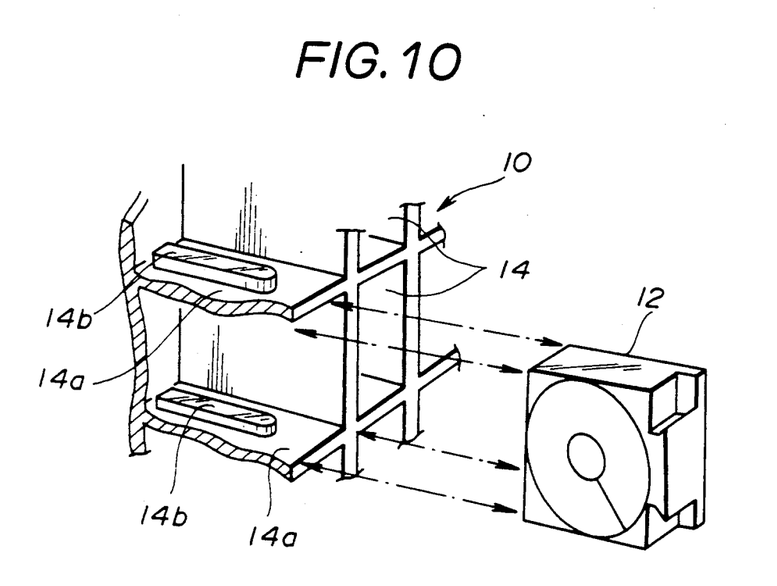
FIG. 10 is a perspective view showing a portion of the cartridge storage compartment of the storage rack in one embodiment of the invention.

Referring to FIG. 10 showing one embodiment, a guide means 14b protrudes from the bottom 14a of the compartment 14 so that the microfilm cartridge 12 is pushed into the compartment 14 while being guided by this guide 14b. The posture of each microfilm cartridge 12 is normalized by the presence of this guide 14b which has a constant length and width to adjust the position of the microfilm cartridge 12 when it is stored in the compartment 14.

Figure 12A:
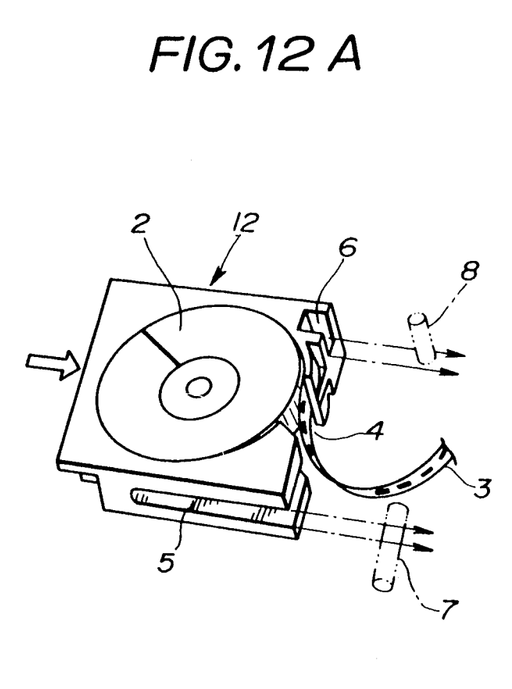
FIGS. 12A and 12B are perspective views of the microfilm cartridge as viewed from different directions.
Figure 12B:
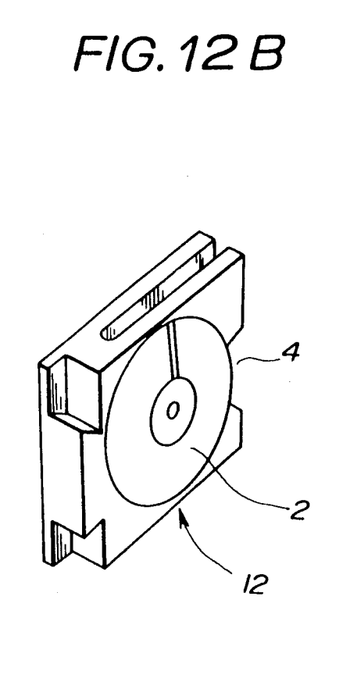

The microfilm cartridge 12 is of the type as stipulated by ANSI (American National Standard of Industry), as shown in FIG. 12A and 12B. The microfilm cartridge 12 has a reel 2 on which a microfilm roll 3 is taken up, and also has a film paying port 4 from which microfilm roll 3 is paid out. An elongated groove 5 is formed along the end face of one side wall which is perpendicular to the side wall through which the film paying port 4 is provided, as shown in FIGS. 12A and 12B. One end of the groove 5 is opened so that the cartridge 12 can be pushed into the compartment 14 in the direction as shown by the arrow in FIG. 12A. A recess 6 is provided at a portion of the end face of the side on which the film paying port 4 is provided.

In the conventional system shown in FIG. 12A, a pin 7 for engaging with the elongated groove 5 and another pin 8 for engaging with the cut-out 6 are provided, these pins 7 and 8 extend in the directions perpendicular with each other to regulate the posture or orientation of the cartridge 12 when it is pushed into and stored in the compartment 14. The thickness of the pin 7 is enough smaller than the width of the groove 5, and the thickness of the pin 8 is also enough smaller than the width of the cut-out 6. Accordingly, it becomes necessary to adjust the position of the cartridge 12 in the widthwise direction of the compartment 14. For this purpose, a leaf spring for pushing the cartridge 14 into a regular position is provided on an interior wall of the compartment 14, or the cartridge 12 is restrained by a restrainer plate which is biased by a spring.

In one embodiment of the invention, a guide 14b extending along the bottom of the compartment 14 is provided so that the cartridge 12 is pushed into the compartment 14 while the guide 14b is engaged with the elongated groove 5. The orientation of the cartridge 14 is thus regulated since the elongated groove 5 of the cartridge 12 must be engaged with the guide 14b, and the dislocation in the widthwise direction of the compartment 14 is also adjusted. The orientation and positioning of the cartridge 12 is thus regulated by an extremely simple construction.

Figure 11A:
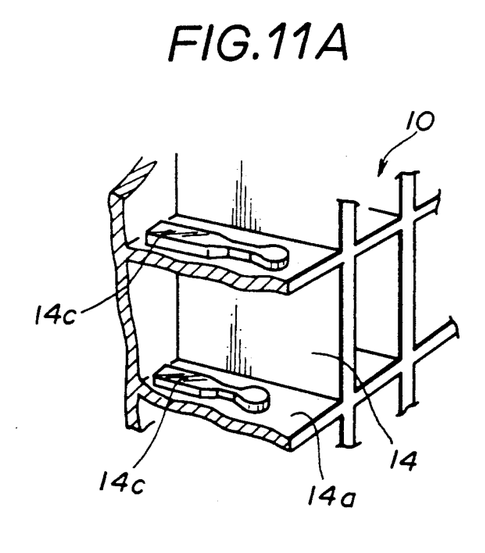
FIGS. 11A and 11B are perspective views showing the cartridge storage compartments of the storage racks according to other embodiments of the invention.
Figure 11B:
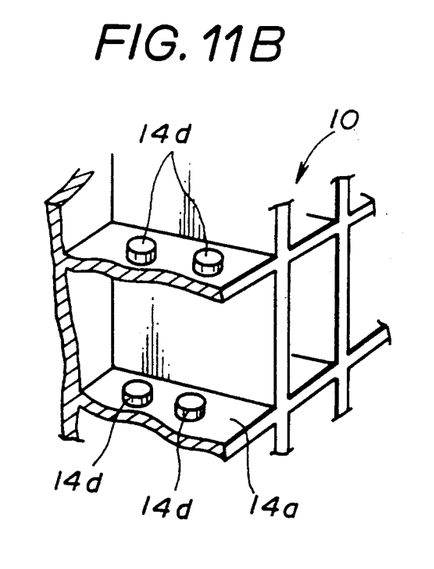

In another embodiment shown in FIG. 11A, a guide 14c has a configuration such that an intermediate portion thereof is concaved while allowing smooth engagement of the guide 14c with the side faces of the elongated groove 5. When some cartridge 12 is inserted into an addressed compartment 14 while being held in a slanting condition, slanting of the cartridge 14 in the widthwise direction of the compartment 14 is adjusted as the cartridge 14 is pushed into the compartment 14 by means of the concaved portion of the guide 14c. In a further embodiment shown in FIG. 11B, two projections 14d, 14d are provided along the direction along which the cartridge 12 is pushed so that a splitted guide pair is formed in place of the guide 14b shown in FIG. 10.

Similar construction for receiving the cartridge 14 in a regular position and in a proper alignment may be adopted in an cartridge loading port 52 of an image reader 50 or a backet 74 of a buffer 70, which will be described in detail hereinafter. The guide means 14b, 14c or 14d may be provided on the top interior wall of the compartment 14 in lieu of providing on the bottom of the compartment 14.

Referring back to FIGS. 1 to 3, the general construction of the system of this invention will be described further. A window 16, which is elongated in the vertical direction, is provided at a substantial center of the rack 10 to serve as a delivery port. The selected cartridge 14 may be delivered through this window or delivery port 16 from the space in front of the rack 10 to the space behind the rack 10, or vise versa.

A carrier 20 is provided to move in the vertical plane while facing to one side, i.e. the open front face, of the rack 12 on which plural separate comaprtments 14 are formed. In detail, vertical guide rails 22 (only one of these guide rails 22 is shown in FIG. 3) are fixed on the side edges of the rack 10, and a horizontal beam 24 extends between these guide rails 22 to be moved in the upward and downward directions. The carrier 20 is supported by the horizontal beam 24 and moved two-dimensionally in the space in front of the open front face of the rack 10 by the action of servo motors (not shown).

The carrier 20 is moved to a position facing to a compartment 14, in which a desired microfilm cartridge 12 is stored, to take out the cartridge 12, and then carries the cartridge 14 to the window 16. The carrier 20 is also operated to return the cartridge 12 to the addressed compartment 14 while moving from the position facing to the window 16 to the position facing to the addressed compartment 14. The construction of the carrier 20 is shown in FIG. 4.

Figure 4:
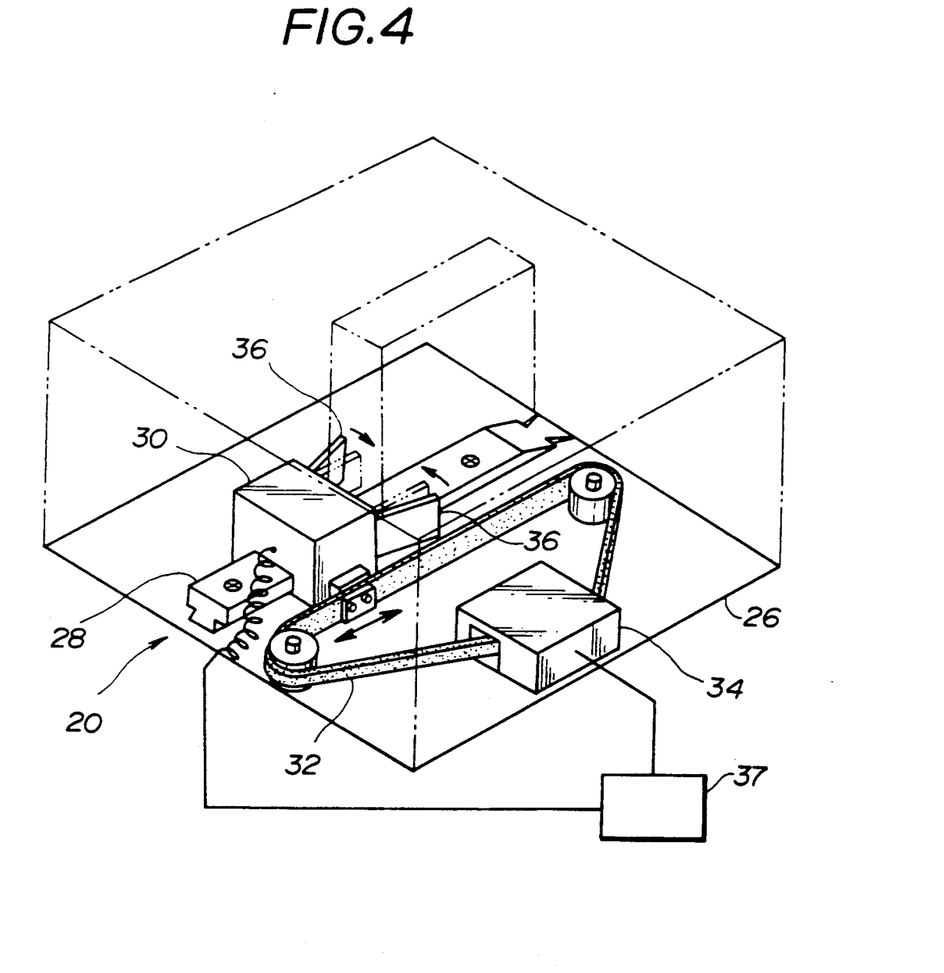
FIG. 4 is a schematic illustration showing the cartridge handling mechanism assembled in the carrier.

Referring to FIG. 4, the carrier 20 has a support plate 26 on which a guide rail 28 is fixedly mounted to extend in the direction perpendicular to the open front face of the rack 10. A cartridge handler 30 is guided by the guide rail 28 to be moved in the direction perpendicular to the open front face of the rack 10. An endless belt 32 is driven by a drive mechanism 34 and has a portion running parallel to the guide rail 28. The cartridge handler 30 is fixed to the endless belt 32 to be moved in the forward or backward direction, as desired, so that it moves close to or remote from the compartment 14.

The cartridge handler 30 has a pair of clamping plates 36 which extend toward the rack 10. These clamping plates 36 are driven by a not-shown magnetic solenoid so that the free ends thereof are moved close to each other to a closed condition or remote from each other to an open condition. The forward or backward movement of the cartridge handler 30 and the closing or opening operation of the clamping plates 36 are controlled by a handler controller 37.

Figure 5A:
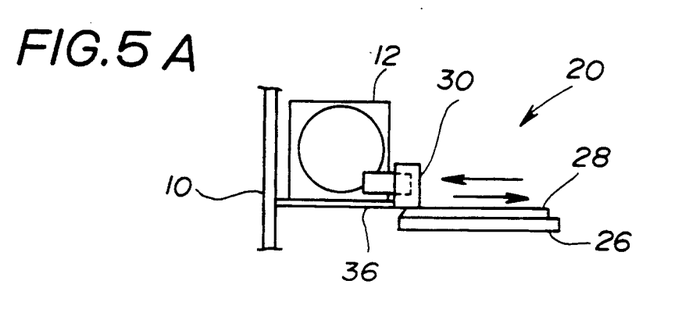
FIGS. 5A to 5C are diagrammatical views showing the operation sequence for taking a selected microfilm cartridge out of the storage compartment.
Figure 5B:
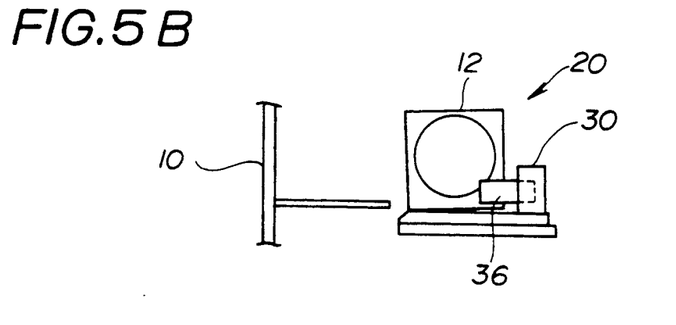
Figure 5C:
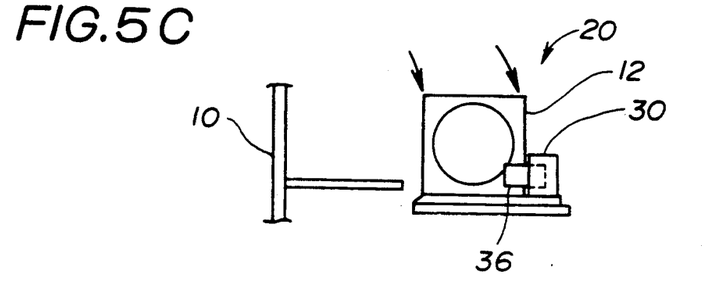

When the carrier 20 is moved to a position facing to one compartment 14 in which a desired microfilm cartridge 12 is stored, the cartridge handler 30 is moved forwards and the desired microfilm cartridge 12 is clamped by the clamping plates 36 as shown in FIG. 5A. The thus clamped cartridge 12 is taken out of the compartment 14 as the handler 30 is retracted. In this operation, since the vertical position of the carrier 20 relative to the cartridge 12 is dislocated more or less, a differed gap is left between the top face of the guide rail 28 and the bottom side face of the cartridge 12 when the cartridge 12 is taken out of the compartment 14, and thus the cartridge 12 is slanting at a different angle as shown in FIG. 5B. In order to align the vertical position, the clamping plates 36 are once opened to engage the bottom side face of the cartridge 12 with the top face of the guide rail 28, and then closed again to clamp the cartridge 12 as shown in FIG. 5C.

As shown in FIG. 3, the rack 10 and the carrier 20 are contained in a container case 38 having one side closed by an openable glass plate 40. The carrier 20 is movably contained in the space between the open front face of the rack 10 and the glass plate 40 so that it is visible from the outside of the container case 38.

An image reader 50 is located behind the rack 10, namely at the side opposite to the side at which the carrier 20 is provided. As seen from FIGS. 2 and 9, the image reader 50 and the container case 38 containing therein the rack 10 are arranged in the mutual relationship so that they form a T-shaped configuration in plan view.

As shown in FIG. 1, the image reader 50 has a cartridge loading port 52 on the right side to receive the cartridge 12. The cartridge 12 is loaded into the cartridge loading port 12 vertically from the open top thereof, and the microfilm in the thus loaded cartridge 12 is taken up around a take-up reel 54 to search a target image. For instance, when an address cord for identifying the target image is put in by a keyboard 55, the thus addressed target image is automatically searched to be projected on a screen 56. The image may be scanned by a line sensor or like and printed by a printer (see FIG. 2), as desired. Loading of a certain cartridge 12 into the cartridge loading port 52 and searching of a target image may be effected by manual operations.

FIG. 1 also shows cartridge delivery means 73, which comprises a buffer 70 and a lift 72 in the illustrated embodiment, for delivering the cartridge 12 to the image reader 50. The buffer 70 passes the cartridge 12 from the carrier 20 through the window 16 provided through the rack 10. The buffer 70 serves as temporary storage means for storing the microfilm cartridge 12 and changes the posture or orientation of the cartridge 12 and then passes the same to the lift 72. The lift 72 lifts the cartridge 12 from the buffer 70 and delivers the same to the cartridge loading port 52 of the image reader 50, and returns the cartridge 12 from the cartridge loading port 52 back to the buffer 70.

Figure 6:
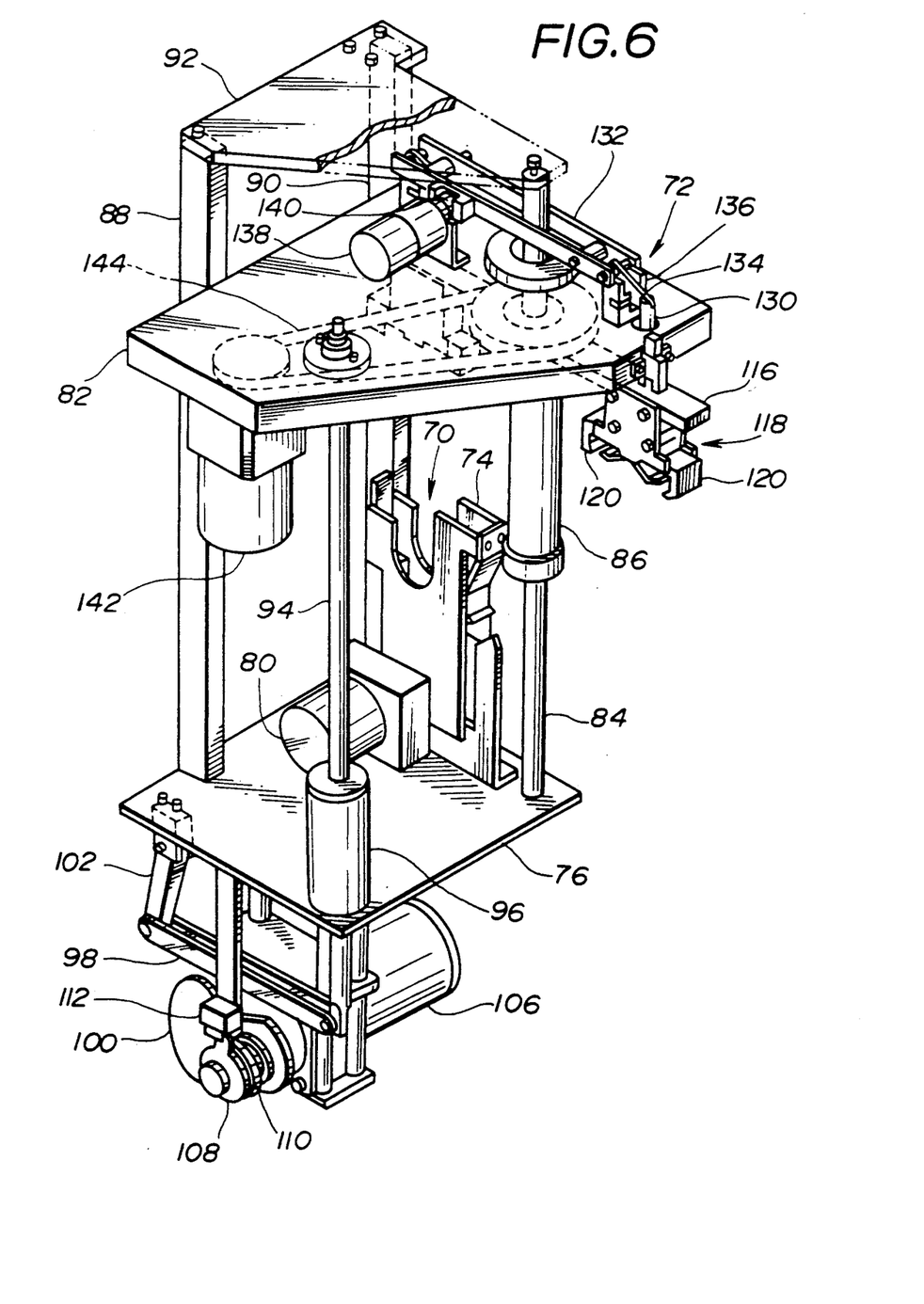
FIG. 6 is a perspective view showing the delivery means comprising the buffer and the lift.
Figure 7:
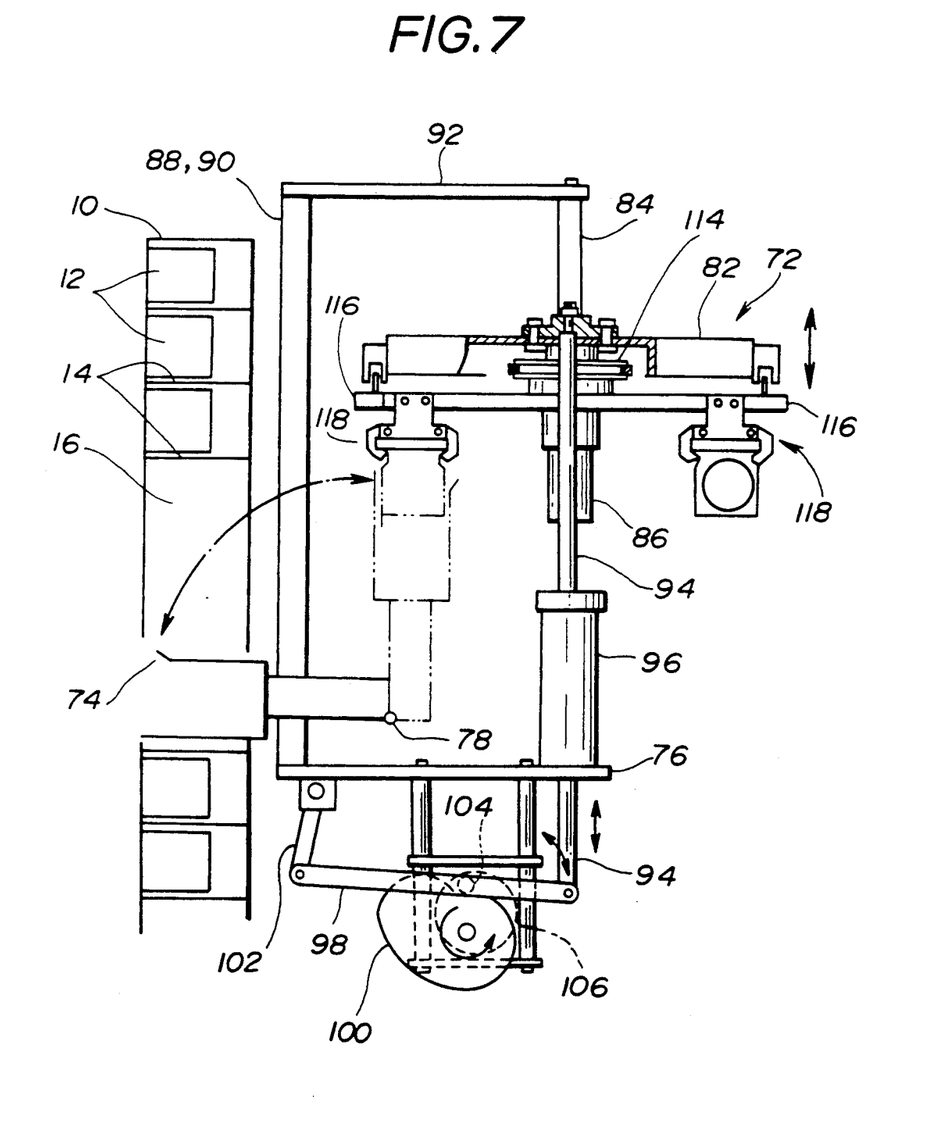
FIG. 7 is an elevational view, partly in section, showing the operations of the buffer and the lift shown in FIG. 6.

FIG. 6 is a perspective view of the buffer 70 and the lift 72, and the operations of the buffer 70 and the lift 72 are shown in FIG. 7.

The buffer 70 comprises a backet 74 which is swingably mounted on a support 76 by a shaft 78 (see FIG. 7). The backet 74 is swung from a horizontal position (shown by the real line in FIG. 7) to a vertical position (shown by the phantom line in FIG. 7) by means of a motor 80 (see FIG. 6). The backet 74 has a swinging open end into which the selected cartridge 12 is received. The backet 74 moves into the window 16 of the rack 10 and faces to the carrier 20 while being held in the horizontal position. The cartridge 12 is passed from the carrier 20 to the backet 74 held in the horizontal position, and passed from the backet 74 held in the vertical position to the lift 72 (see FIG. 1).

The lift 72 has a movable plate 82 which is movable in the vertical direction. The movable plate 82 is carried by a linear bearing 86, which is mounted on a guide rod 84, to be moved in the vertical direction together with the linear bearing 86. The top end of the guide rod 84 is mounted to an upper plate 92 which is fixedly connected through posts 88 and 89 to the support 76. The lower end of the guide rod 84 is fixed to the support 76.

The movable plate 82 is moved in the vertical direction by means of a push rod 94 which extends through the support 76. In detail, the push rod 94 is movably carried by a linear bearing 96 fixed on the support 76 to be moved in the vertical direction, and has an upper end fixed to the movable plate 82 and a lower end connected to one end of a link 98 which is engaged with a cam disc 100 to be pushed upwards. The other end of the link 98 is connected through another link 102 to the lower side of the support 76. A cam follower 104 (see FIG. 7) engages with the cam disc 100.

With the construction as described above, as the cam disc 100 is rotated by a motor 106, the push rod 94 is moved upwards and downwards by the link 98. The angular position of the cam disc 100 may be determined by detecting the positions of discs 108 and 110 by a photo-sensor 112.

Figure 8:
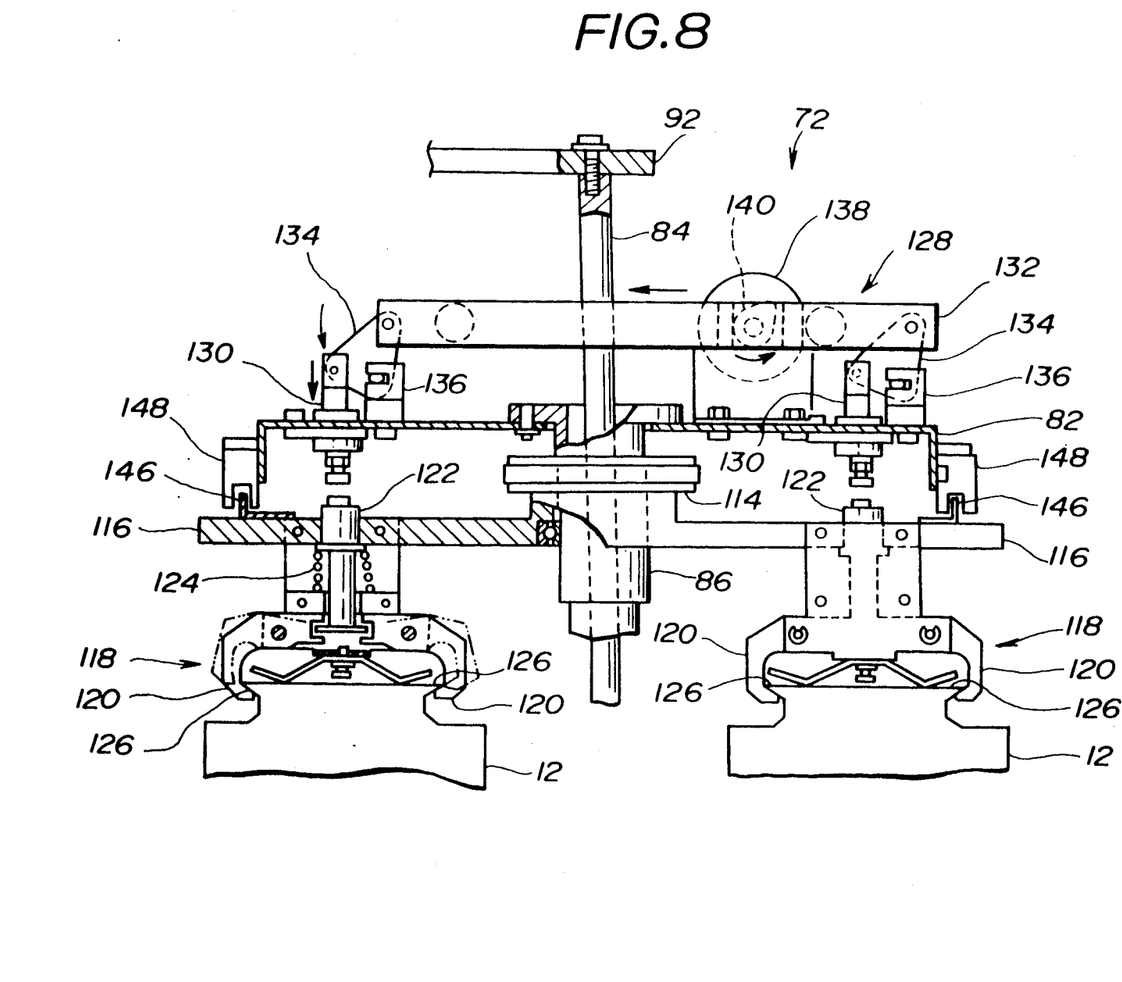
FIG. 8 is an elevational view, partly in section, showing the cartridge gripper of the lift.

As shown in FIG. 8, a pulley 114 is rotatably mounted on the outer periphery of the linear bearing 86 which carries the movable plate 82. Paired arms 116, 116 protrude symmetrically in the radial direction. Cartridge grippers 118, 118 are mounted to these arms 116, 116. Each of the grippers 118 has a pair of swingable pawls 120, 120. A push rod 122 extending vertically through the arm 116 has a lower end engaging with these pawls 120, so that the pawls 120 are opened as the push rod 122 is moved downwards and the pawls 120 are closed as the push rod 122 is returned to the normal upper position by a restoring spring 124. The free ends of these pawls 120, 120 engage with engage projections 126, 126 of each cartridge 12 to grasp the cartridge 12 as they are in the closed condition, and disengage from the engage projections 126, 126 to release the cartridge 12 when they are in the opened condition.

The grippers 118 are opened and closed by means of a driver mechanism 128 mounted on the upper face of the movable plate 82. The driver mechanism 128 comprises upper push rods 130, 130 held by the movable plate 82 to be moved upwards and downwards while facing to respective push rods 122 when the push rods 122 are in the position for operating grippers 118 to grasp or release the cartridges 12; two substantially triangular crank plates 134, 134 each having a first apex corner connected to the upper end of each upper push rod 130 and a second apex corner connected to one end of a connection rod 132; and stoppers 136, 136 each connected to a third corner of each crank plate 134 to limit the vertical movement relative to the movable plate 82. The connection rod 132 is reciprocally moved in the horizontal direction by a cam 140 rotated by a motor 138. When the cam 140 is rotated in the counterclockwise direction as viewed in FIG. 8, the connection rod 132 is moved in the left hand direction so that the crank plate 134 pushes down the upper end of upper push rod 130. As a result, when the push rod 122 for operating the cartridge gripper 118 is positioned beneath the upper push rod 130, the push rod 122 is lowered to open the pawls 120.

The grippers 118 and the arms 116 may be rotated around the linear bearing 86 together with the pulley 114, and rotational movements thereof are controlled by a motor 142 mounted on the lower face of the movable plate 82 (see FIG. 6). The rotational movement of the motor 142 is transmitted through a belt 144 to the pulley 114. Light-shielding plates 146, 146 fixed in position on the movable plate 82 are detected by photo-sensors 148, 148, whereby each arm 116 is stopped at a position at which the push rod 122 for operating the grippers 118 faces to the upper push rod 130 of the driver mechanism 128. At this position, one gripper 118 is positioned just above the backet 74 which is in the vertical or upstanding position, and the other grippers 118 is positioned just above the cartridge loading port 52 of the image reader 50.

By lowering the lift 72 at this position, the gripper 118, 118 are opened to grasp the cartridge 12 contained in the backet 74 or the cartridge loading port 52 by the pawls 120. The lift 72 is raised and then the arms 116, 116 are rotated by 180 degrees, a cartridge 12 is passed from the backet 74 to the cartridge loading port 52 or vise versa, or cartridges 12 received in the backet 74 and the cartridge loading port 52 are exchanged.

The operation of the entire system according to this embodiment will be described. Plural microfilm cartridges 12 are stored in the rack 10, and the identification cords and stored locations (addresses) of respective microfilm cartridges 12 are put through the keyboard 55 to be memorized in a controller 57. By putting the identification cords of respective target images from the keyboard 55 successively, the carrier 20 is moved to the position facing to the cartridge 12 containing therein a microfilm having a first target image. The thus selected microfilm cartridge is taken out of the rack 10 and moved to the window 16. On the other hand, the backet 74 of the buffer 70 is moved in the window 16 while being in the horizontal position. The cartridge 12 is passed from the carrier 20 to the backet 74 which is turned to the vertical position upon receival of the cartridge 12 and then moved out of the window 16 to the position beneath the gripper 118. Then, the lift 72 is lowered to grasp the cartridge 12 by the gripper 118, and then raised again. The arm 116 is rotated by 180 degrees to move the cartridge 12 as the position facing to the cartridge loading port 52. The lift 72 is then lowered to insert the cartridge 12 into the cartridge loading port 52, and the pawls 120 of the gripper 118 are opened to release the cartridge 12. Thereafter, the lift is raised to move the gripper 118 upwards.

Figure 9:
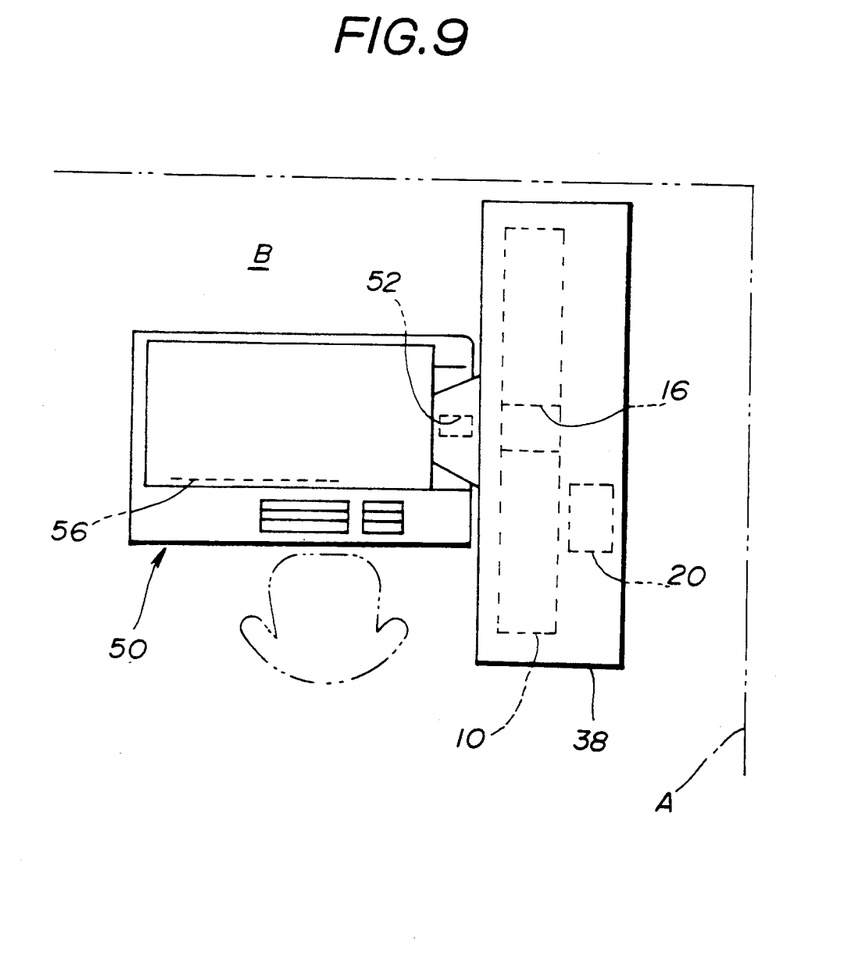
FIG. 9 is a plan view showing the arrangement of the entire system.

As best seen from FIG. 9, the system of the invention may be arranged so that the front open face of the rack 10, at which the carrier 20 is provided, faces to one of the walls A defining an office room while leaving a proper spacing from the wall A. A vacant space B is thus left behind the image reader 50 to enable easy access to the backside of the image reader 50 for inspection and maintenance operations.

By transferring a next microfilm cartridge 12 from the rack 10 to the backet 74 prior to lowering the lift 72 to unload the first cartridge 12 from cartridge loading port 52, the next cartridge 12 held in the backet 74 can be grasped by one gripper 118 simultaneously with taking the first cartridge 12, which has been read by the image reader 50, out of the cartridge loading port 52. Then, as the lift 72 is rotated by 180 degrees, the next cartridge 12 is loaded into the cartridge loading port 52 of the image reader 50 and simultaneously the first cartridge 12 is transferred to the buffer 70. Accordingly, the time required for exchanging microfilm cartridges can be further reduced.

According to the present invention, a carrier is movably disposed in a space facing to an open front face of a rack having a cartridge delivery port extending from the open front face through the backside wall, and an image reader having a cartridge loading port at one of its side walls is arranged so that the cartridge loading port is positioned close to the cartridge delivery port. Accordingly, a large vacant space is left around the carrier facing to the open front face of the rack to enable easy access to the carrier. Furthermore, a sufficiently large space is left behind the image reader to ensure easy access to the backside of the image reader to facilitate inspection or other operations of the image reader. When a window is provided through the rack to serve as the cartridge delivery port, each selected cartridge is passed through the window along a delivery passage having the minimal moving length to reduce the time required for delivery. The system of the invention can thus be arranged reasonably to ensure full use of the available room. However, the delivery port is not limited to such a window provided at the substantial center of the rack, but may be formed by cutting away a portion (for example, one corner) of the rack.

Since the image reader is arranged behind the storage rack and the carrier for taking out microfilm cartridges stored in the rack is disposed at the space facing to the open front face of the rack, the cartridges being delivered through the delivery port extending through the body of the rack, vacant space is left in front of the rack to ensure easy microfilm cartridge storing and exchanging operations. According to a further aspect of the invention, the selected cartridge is turned to change its posture or orientation while being retained by a buffer which is positioned within the delivery port, a space required for such a turning operation is saved to reduce the dimensions of entire system. Since the carrier is not porvided with a mechanism for turning the cartridge, the carrier can be compactmized and the size and weight thereof can be reduced to decrease the inertia thereof, whereby the moving speed of the carrier can be increased while using a smaller and lighter driving mechanism.

When each microfilm cartridge is contained in the rack with one of its thin side wall contacting with the bottom of each storage compartment and each cartridge is passed to a buffer having a backet which is swingable about a horizontal axis substantially parallel to the widthwise direction of the rack to turn the cartridge to be in the posture or orientation ready for receival by the microfilm loading port of the image reader, according to a further aspect of the invention, the width of the microfilm delivery port can be decreased to save space.

What is claimed is:

1. A microfilm cartridge storage and retrieval system for storing microfilm cartridges and for selectively retrieving a desired microfilm cartridge from the stored cartridges, comprising:

a storage rack having an open front face and having plural cartridge storage compartments each storing therein one microfilm cartridge, said plural cartridge storage compartments being arranged two-dimensionally such that their open front faces extend along a substantially vertical plane;

a carrier for delivering said microfilm cartridges into and out of said storage rack and positioned in front of said open front face of said storage rack to be moved two-dimensionally along the vertical and horizontal planes; and an image reader for reading the images contained in the selectively retrieved microfilm cartridge and positioned behind said storage rack;

said storage rack having a delivery port through which said selectively retrieved microfilm cartridge is delivered from said compartment beyond the backside face of said storage rack;

said image reader having a microfilm cartridge loading port provided at a position close to said delivery port of said storage rack;

whereby said selectively retrieved microfilm cartridge is pulled out of said storage rack by said carrier to be moved in the space in front of said storage rack and then delivered through said delivery port to said cartridge loading port.

2. The system according to claim 1, wherein said carrier moves through said delivery port to deliver said selectively retrieved microfilm cartridge to said cartridge loading port.

3. The system according to claim 1, further comprising delivery means movably disposed in the space behind said storage rack to move into said delivery port for receiving said selectively retrieved microfilm cartridge from said carrier to deliver the same to said cartridge loading port.

4. The system according to claim 3, wherein said delivery means has means for turning the posture or orientation of the received microfilm cartridge during the delivery operation so that said microfilm cartridge is loaded onto said cartridge loading port in a predetermined posture.

5. The system according to claim 4, wherein said delivery means comprises a buffer disposed in the space behind said storage rack for moving into said delivery port to receive said selectively retrieved microfilm cartridge from said carrier and to turn the posture of the received microfilm cartridge; and a lift movably disposed in the space behind said storage rack for receiving said microfilm cartridge from said buffer to deliver the same to said cartridge loading port.

6. The system according to claim 5, wherein each microfilm cartridge is stored in each of said compartments in the upstanding condition so that the microfim paying port of said microfilm cartridge faces opposite to the open front face of said storage rack, and wherein said buffer comprises a backet which is swingable about a horizontal axis parallel to the open front and backside faces of said storage rack so that the posture of said selectively retrieved microfilm cartridge is turned by the swinging movement of said backet.

7. The system according to claim 1, wherein said delivery port is positioned at a substantial center of said storage rack.

8. The system according to claim 7, wherein said storage rack and said image reader are arranged such that the top face along the longitudinal direction of said image reader extends from a substantial center of the top face of said storage rack in the direction substantially perpendicular to the top face of said image reader.

9. The system according to claim 1, wherein guide means is provided on the interior wall of each compartment to determine the moving direction of each microfilm cartridge when it is pulled out of and pushed into each compartment, and each microfilm cartridge has one side provided with an elongated groove having one end opened to receive said guide means to ensure that each microfilm cartridge is pushed into each compartment along the determined direction to be fixed in position.

10. A method of storing plural microfilm cartridges in a storage rack and for selectively retrieving a desired microfilm cartridge from said storage rack to read the images contained in the selectively retrieved microfilm cartridge, comprising the steps of:

storing plural microfilm cartridges in said storage rack which has an open front face extending along a substantially vertical plane and a delivery port extending from said open front face to an open backside face of said storage rack;

taking up said desired microfilm cartridge from the front face of said storage rack and then delivering the same through said delivery port to an image reader positioned in the space behind said open backside face of said storage rack; and reading the images of the microfilm contained in the microfilm cartridge delivered to said image reader.

11. The method according to claim 10, wherein the posture or orientation of each microfilm cartridge is turned so that it is loaded on a cartridge loading port of said image reader in the condition ready for reading the images.

12. The method according to claim 10, wherein said delivery port is positioned at a substantial center of said storage rack.

* * * * *